United States Patent [19]

Charles et al.

[11] Patent Number: 4,974,578
[45] Date of Patent: Dec. 4, 1990

[54] HOUSING FOR MOUNTING A SPINDLE OF AN INTERNAL DIAMETER SAW BLADE

[75] Inventors: Wesley E. Charles, Pompton Lakes; Roabert E. Steere, Jr., Boonton, both of N.J.

[73] Assignee: Silicon Technology Corporation, Oakland, N.J.

[21] Appl. No.: 395,370

[22] Filed: Aug. 17, 1989

[51] Int. Cl.$^5$ .................................. B28D 5/00
[52] U.S. Cl. ........................ 125/14; 51/73 R; 83/647.005; 83/915.005
[58] Field of Search ............... 83/647.5, 581, 485, 83/915.5; 51/73 R; 125/14, 13.01, 13.02, 13.03

[56] References Cited

U.S. PATENT DOCUMENTS

| | | | |
|---|---|---|---|
| 2,930,415 | 3/1960 | Cravens | 83/485 |
| 3,702,604 | 11/1972 | Jones | 125/14 |
| 4,209,005 | 6/1980 | Treneau | 51/73 R X |
| 4,420,909 | 12/1983 | Steere, Jr. | 51/73 R |
| 4,537,177 | 8/1985 | Steere, Jr. et al. | 51/73 R X |
| 4,771,759 | 9/1988 | Zoebeli | 51/73 R X |

Primary Examiner—Frank T. Yost
Assistant Examiner—Kenneth E. Peterson
Attorney, Agent, or Firm—Kenyon & Kenyon

[57] ABSTRACT

The wafering machine is provided with a two-piece housing for mounting the spindle of the saw blade. One housing part is mounted on a fixed axis of a support shaft while the other part is pivotally mounted relative to the first housing part about a pivot axis perpendicular to the support shaft axis. Locking screws are provided to fix the two housing parts together while adjustment blocks with adjusting screws are provided to carry out a rotational adjustment of the rotatable housing part. Rotation of the housing part causes the axis of the spindle to be brought into alignment with the fixed axis of the pivotal cutting motion such as to maintain the plane of the cutting portion of the saw blade parallel to the pivotal cutting motion.

12 Claims, 4 Drawing Sheets

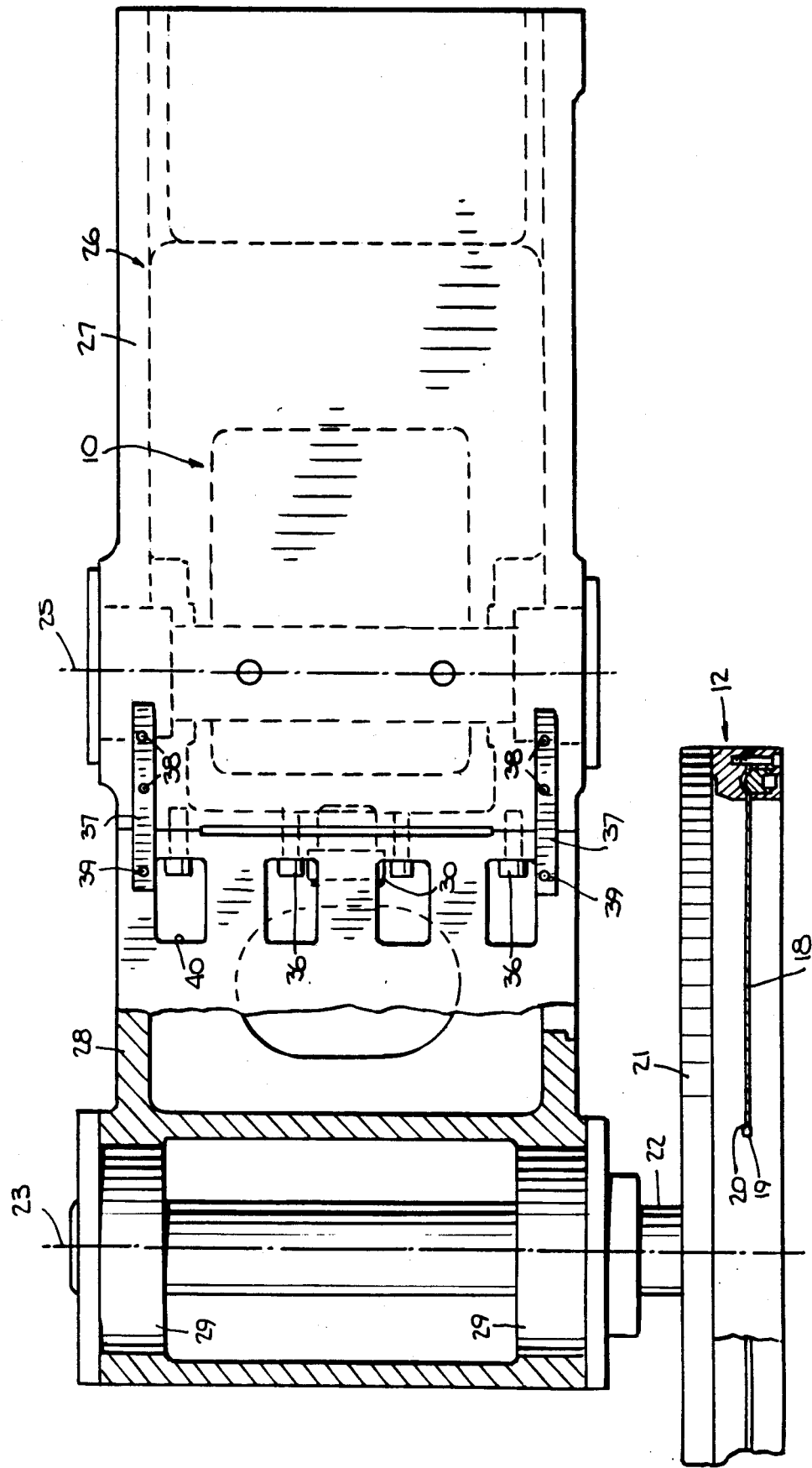

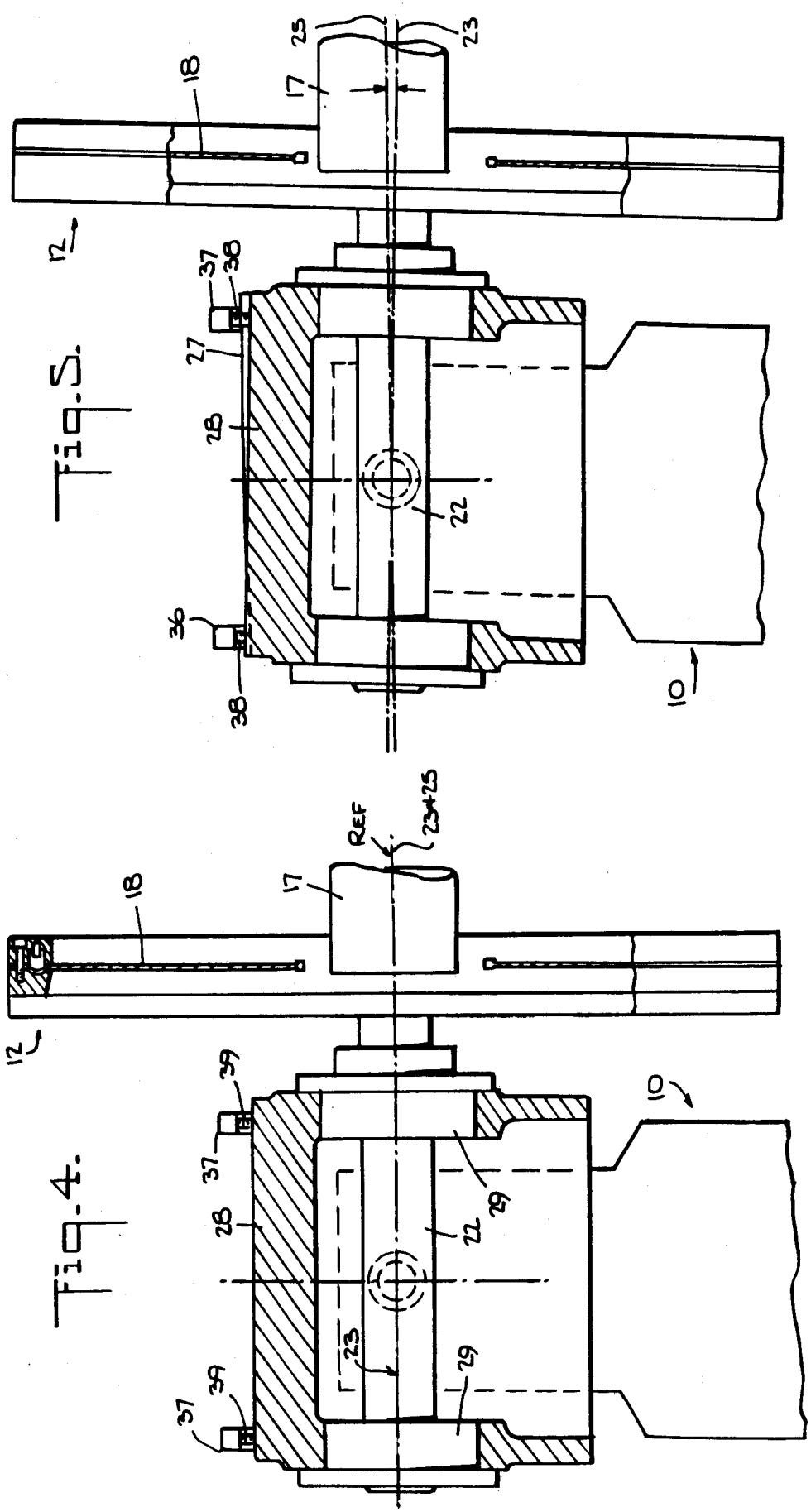

HOUSING FOR MOUNTING A SPINDLE OF AN INTERNAL DIAMETER SAW BLADE

This invention relates to a housing for mounting spindle of an internal diameter saw blade. More particularly, this invention relates to a spindle mounting for a wafering machine.

As is known, wafering machines have been constructed in a manner such as described in U.S. Pat. No. 4,420,909 so that wafers may be sliced from a crystal ingot by means of an internal diameter saw blade. To this end, the saw blade has been mounted in a manner to move in a pivotal cutting motion generally perpendicular to the axis of the ingot during a slicing operation.

As is also known, internal diameter saw blades ha been mounted in a cantilevered manner on rotatable spindles within cutting heads which, in turn, are mounted in housings which can be pivoted about a fixed axis generally parallel to the axis of the crystal ingot. However, because of the weight of the saw blade and cutting head, the spindle deflects so that the plane of the blade deviates from a true perpendicular relationship relative to the fixed axis of the pivotal cutting motion. Thus, during a cutting operation, the cutting portion of the saw blade does not remain truly perpendicular to the pivotal cutting axis. As a result, the wafers which are sliced from the crystal ingot have a greater statistical deviation from true flatness and true uniform thickness. Accordingly, these wafers require subsequent working in order to obtain wafers for the subsequent manufacture of semi-conductor chips.

Accordingly, it is an object of the invention to ensure a precise perpendicular relationship between a cutting portion of a saw blade and the fixed axis of the pivotal cutting motion of a crystal ingot during slicing.

It is another object of the invention to produce wafers from an ingot with truly minimum statistical deviation from flat parallel surfaces.

It is another object of the invention to be able to adjust the alignment of a saw blade relative to the fixed axis of the pivotal cutting motion in a wafering machine in a simple rapid manner.

Briefly, the invention provides a housing for mounting a spindle of an internal diameter saw blade which can be adjusted from time-to-time as required, to reposition the spindle relative to a fixed axis of a pivotal cutting motion. The housing includes a first part which has a bore, or the like, for mounting on a stationary support shaft about a first fixed axis, i.e. the axis of the pivotal cutting motion, as well as a second housing part having a bore, or the like, for receiving the spindle of a saw blade on a second axis parallel to the first axis. In addition, means are provided for pivotally mounting the second housing part on the first housing part on a pivot axis which is perpendicular to the fixed axis as well as to the axis of the spindle. Suitable locking means are also provided for releasably securing the second housing part to the first housing part. In addition, an adjusting means is provided for pivoting the second housing part on the pivot axis when the locking means have been released.

The first part of the housing is mounted on the support shaft axis so as to be able to pivot the housing and, thus, a cutting head containing an internal diameter saw blade about the axis of the support shaft during slicing of a crystal ingot.

The second housing part is adjustable relative to the fixed housing part so that the spindle axis can be brought into alignment with the fixed axis of the pivotal cutting motion in order to compensate for any deviations therebetween. For example, assuming the spindle is mounted in the bore, or the like, of the second housing part during initial assembly such that its axis is parallel to the fixed pivotal cutting axis and since the saw blade and cutting head are mounted in a cantilever manner on the spindle, that end of the spindle tends to defect under the weight of the cutting head and a blade. In this case, the axis of the spindle is deflected to a position out of parallel to the axis of the pivotal cutting motion, that is, the plane of the saw blade is not in a true vertical plane relative to the fixed axis of the pivotal cutting motion. In order to compensate for this, the locking means for locking the adjustable housing part on the fixed housing part is released. The adjusting means is then used to pivot the adjustable housing part on the pivot axis an amount sufficient to align the axis of the spindle with the fixed pivotal cutting motion axis such that the cutting portion of the saw blade which is to actually cut the ingot is parallel to the pivotal cutting motion. The locking means may then be re-engaged so as to fix the adjustable housing part in this position.

Should the saw blade move from the desired vertical position during the course of wafer production or transport of the machine or changing to a smaller or larger wheel head size, a relatively quick adjustment can be made to bring the cutting portion of the blade back into parallel alignment to the pivotal cutting motion.

These and other objects and advantages of the invention will become more apparent from the following detailed description taken in conjunction with the accompanying drawings wherein:

FIG. 3 illustrates a top view of the housing of FIG. 2 and a cutting head mounted thereon in accordance with the invention;

FIG. 4 illustrates a cross sectional view of the housing, spindle and blade cutting portion relative to a crystal ingot during an initial set-up; and FIG. 5 illustrates the components of FIG. 4 in an adjusted position to maintain the cutting portion of the saw blade perpendicular to a fixed axis of the pivotal cutting motion.

Figure 1:
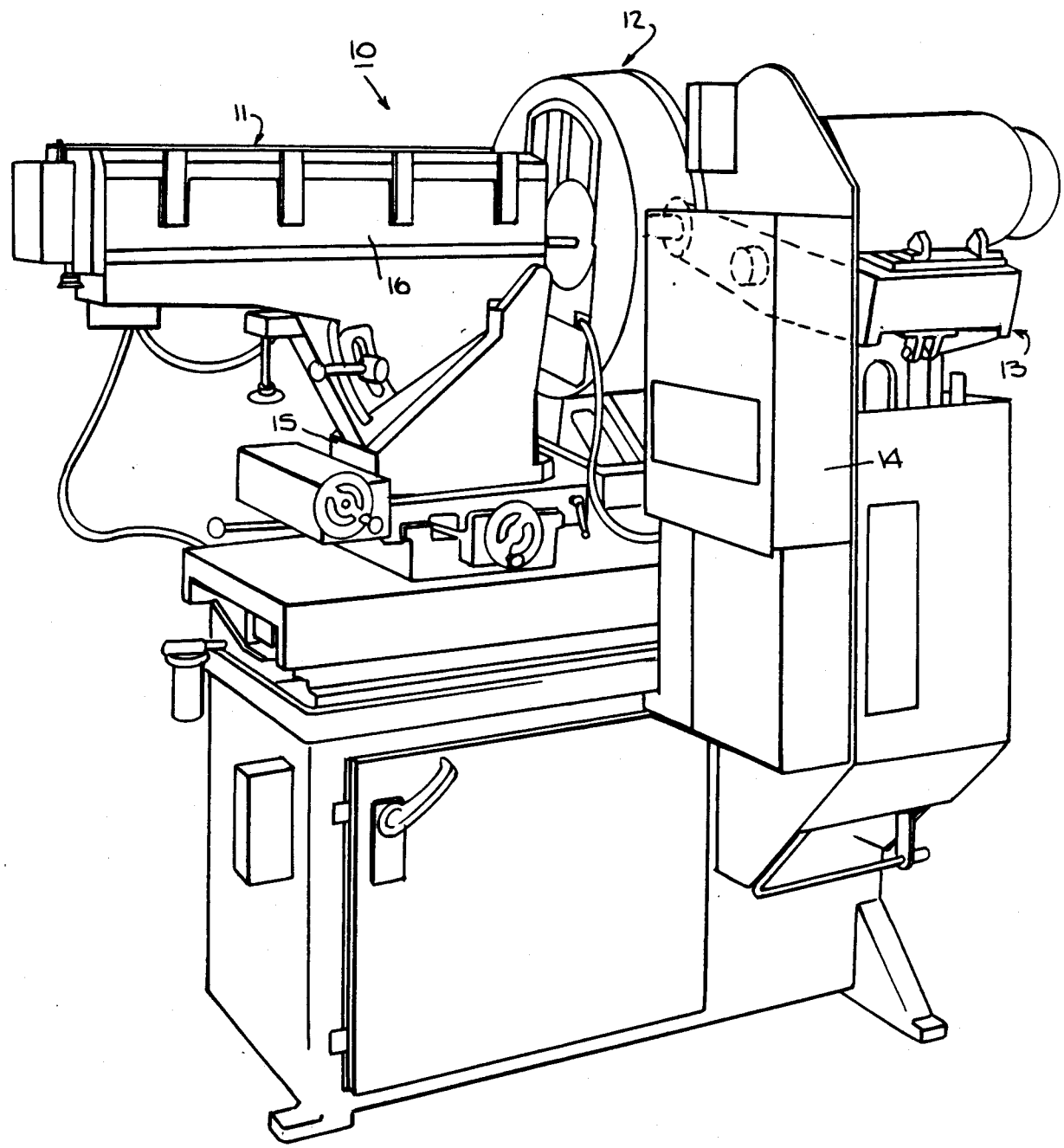
FIG. 1 illustrates a perspective view of a wafering machine in accordance with the invention.

Referring to FIG. 1, the wafering machine 10 includes an ingot feed means 11, a cutting head 12, a mounting arrangement 13 for the cutting head 12 and a control box 14. The remainder of the wafering machine 10 is of generally conventional structure and need not be further described.

The ingot feed means 11 includes a pedestal 15 mounting an ingot box 16 in an offset manner relative to the cutting head 12. The ingot box 16 is mounted in cantilevered relation to the pedestal 15 and in alignment with the cutting head 12. The ingot box 16 includes a known means for moving and positioning a crystal ingot 17 (see FIG. 4) for cutting purposes. The crystal may be of any suitable material such as silicon and is generally of a cylindrical shape.

Referring to FIG. 3, the cutting head 12 is of conventional construction and serves as a means to mount a rotary internal diameter saw blade 18 having a bore 19 and an internal cutting edge 20 about the bore 19. The cutting blade 18 serves to sever wafers from the crystal ingot 17 as is known. The cutting head 12 includes a wheel head housing 21 which is mounted on a spindle 22 for rotation about a spindle axis 23.

Figure 2:
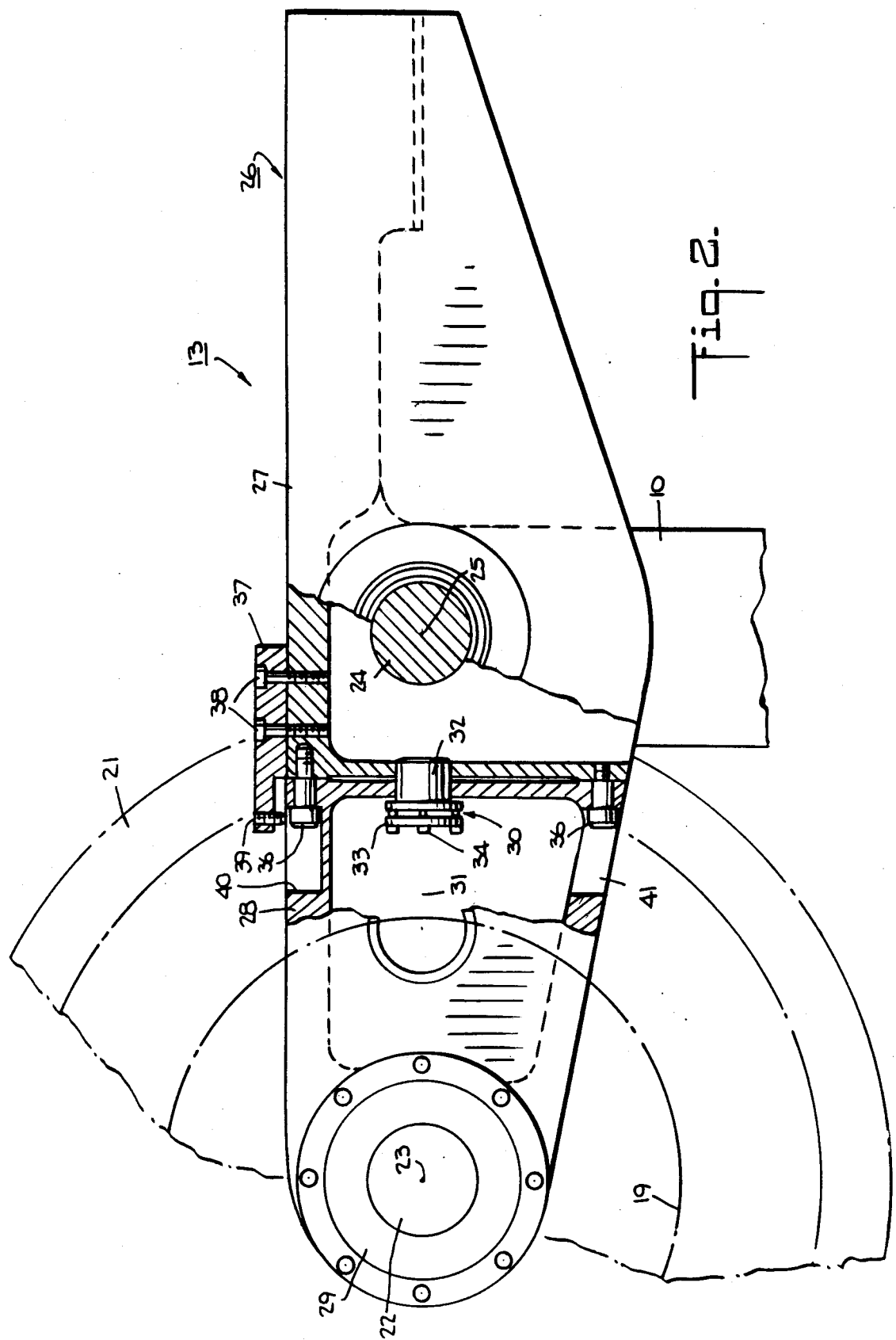
FIG. 2 illustrates a partial cross-sectional view of a housing constructed in accordance with the invention.

Referring to FIGS. 2 and 3, the mounting arrangement 13 includes a support shaft 24 which is mounted on a fixed shaft axis 25 in the frame of the machine 10. As indicated, the shaft axis 25 is parallel and co-planar with the spindle axis 23.

The mounting arrangement 13 also includes a housing 26 having a fixed housing part 27 and an adjustable housing part 28. As indicated, the fixed housing part 27 is pivotally mounted on the support shaft 24 for pivoting about the fixed axis 25. In this way, the cutting head 12 may be pivoted while the saw blade 18 is being rotated so as to sever a wafer from the crystal ingot 17. This housing part 27 may be made of any suitable material such as cast iron and is of rigid construction.

The adjustable housing part 28 mounts a pair of bearings 29 in which the spindle 22 is rotatably mounted. This housing part is also made of rigid construction and of a suitable metal.

The mounting arrangement 13 is provided with a means in the form of an expandable bushing assembly 30 for pivotally mounting the adjustable housing part 28 on the fixed housing part 27 on a pivot axis 31 which is perpendicular to the support shaft axis 25 as well as to the spindle axis 23 (see FIG. 2). The bushing assembly 30 may be an ETP bushing sold by Helland Research & Engineering, Inc., Plymouth, Minn. and including an expandable double walled sleeve 32 having a cavity filled with a semi-solid pressure medium retained by a sealing ring (not shown), a thrust ring 33 and a piston (not shown). Also, suitable screws 34 are provided which pass through the thrust ring 33 into threaded engagement with a collar 35 on the sleeve 32. The screws 34 serve to move the piston into the cavity of the sleeve 32 to expand the sleeve 32 and, thus, remove any looseness in the fixed housing part 27 and the adjustable housing part 28.

The mounting arrangement 13 also has a locking means in the form of locking screws 36 for releasably securing the adjustable housing part 28 to the fixed housing part 27 in an adjusted position about the pivot axis 31. As indicated in FIG. 3, four adjusting screws 36 are provided at an upper surface of the adjustable housing part 28 while a corresponding number are provided at a bottom portion of the housing part 28. The screws 36 pass through the adjustable housing part in unthreaded relation while being threaded into the fixed housing part. Thus, upon tightening of the screws 36 in place, the adjustable housing part 28 is fixed in place whereas upon loosening of the screws 36, the adjustable housing part 28 may be rotated slightly about the pivot axis 31. To this end, the adjustable housing part 28 is provided with slotted bores in order to receive the locking screws 36 to permit this pivotal adjustment.

The mounting arrangement 13 also includes adjusting means for pivoting the adjustable housing part 28 on the pivot axis 31 relative to the fixed housing part 27. As indicated, the adjusting means includes a pair of adjustment blocks 37 which are mounted on the fixed housing part 27 in overlying relation to the adjustable housing part 28 as well as on opposite sides of the pivot axis 31. As indicated, each block 37 is secured to the fixed housing part by a pair of bolts 38. In addition, an adjusting screw 39 is threadably mounted in each block 37 perpendicularly of the adjustable housing part 28 in order to abut the adjustable housing part 28 for pivoting this part 28 about the pivot axis 31. As indicated in FIG. 3, the adjusting screws 39 abut the housing part 28 outside the locking screws 36.

As shown in FIGS. 2 and 3, the upper portion of the adjustable housing part 28 has a plurality of recesses 40 for receiving the locking screws 36 in a recessed manner. The lower portion has a plurality of recesses 41 for similar purposes.

The control box 14 contains various controls for operation of the machine 10 and is of conventional structure.

Referring to FIG. 4, in a schematically fully assembled position, the spindle axis 23 is shown to be in alignment with the fixed shaft axis 25. That is, the fixed housing 27 and the adjustable housing 28 are originally assembled and machined as a unit such that the spindle axis 23 is in the same plane as the fixed axis 25 of the support shaft 4 (see FIG. 3). However, when fully assembled as such, the weight of the sawblade 18 as well as the weight of the cutting head 12 deflects the spindle end downwardly as it projects from the adjustable housing 28. This is also schematically indicated in FIG. 5. In order to correct for this, the locking screws 36 are loosened so that the adjustable housing part 28 is free to rotate about the pivot axis 31 via the bushing sleeve assembly. At this time, the adjusting screws 39 in the respective adjusting blocks 37 are threaded in opposite directions to each other so as to pivot the adjustable housing part 28 about the pivot axis 31. This causes the entire spindle 22 to pivot axis about the pivot 31 so as to move the deflected spindle axis 23 upwardly into alignment with the fixed pivot axis 25. At the same time, the cutting portion of the saw blade 18 is brought into a vertical position perpendicular to the fixed pivot axis 25 (i.e. puts it in a plane parallel to the pivotal cutting motion).

Upon reaching alignment of the spindle axis 23 with the pivot axis 25, the adjusting screws 39 are held in place and the locking screws 36 re-tightened to secure the adjustable housing part 28 to the fixed housing part 27. The adjusting screws 39 can then be backed off in order to relieve the original adjusting stress or the adjusting blocks 37 can be removed completely to eliminate tampering.

As indicated above, the cutting portion of the blade 18 is that portion which contacts the top part of an ingot 17 since this is the only part that cuts. This portion is maintained flat, that is, in a truly parallel plane to the pivotal cutting motion for slicing purposes.

Should an adjustment be required from time-to-time, the machine may be stopped and an adjustment made relatively rapidly and efficiently via the locking screws 36 and adjusting screws 39. The downtime for such an operation is at a relative be adversely effected.

The adjustment of only a portion of the mounting arrangement for a cutting head permits rapid adjustments to be effectively and efficiently performed. This, in turn, reduces the downtime of the wafering machine and leads to an increased production output per shift.

The invention thus provides a mounting arrangement for a saw blade which can be corrected from time-to-time to avoid misalignment between the saw blade and the pivotal cutting motion.

In addition, the invention provides a relatively simple housing for mounting a spindle of an internal diameter saw blade while at the same time permitting rapid adjustments to be made in the positioning of the saw blade.

The invention thus provides a mounting arrangement for a spindle of a cutting blade in which fine adjustments can be made to bring the cutting stroke severing motion run out within tolerance. This permits a compensation for various cutting head weights in addition to original machining tolerances on the housing.

The mounting arrangement maintains the structural integrity of the base machine by using a central pivot pin and relatively heavy bolts for the adjusting screws and locking screws.

The mounting arrangement is such that easy access may be made to the locking screws and adjustment screws for adjustment purposes. In this respect, the adjustment blocks and upper locking screws are provided on the top of the housing. The lower locking screws are provided with easy access on the bottom of the housing.

What is claimed is:

1. A housing for mounting a spindle of an internal diameter saw blade comprising
   a first housing part having a bore for mounting on a stationary shaft about a first fixed axis;
   a second housing part having a bore for receiving a spindle on a second axis parallel to said first fixed axis;
   means for pivotally mounting said second housing part on said first housing part on a pivot axis perpendicular to said fixed axis and said second axis;
   locking means for releasably securing said second housing part directly to said first housing part; and
   adjusting means for pivoting said second housing part on said pivot axis.

2. A housing as set forth in claim 1 wherein said means for pivotally mounting said second housing part is a bushing assembly disposed on said pivot axis.

3. A housing as set forth in claim 2 wherein said bushing assembly includes an expandable sleeve mounted in said first housing part on said pivot axis and rotatably receiving said second housing part thereon.

4. A housing as set forth in claim 1 wherein said locking means includes a plurality of screws passing through said second housing part into threaded engagement with said first housing part in parallel to said pivot axis.

5. A housing as set forth in claim 1 wherein said adjusting means includes a pair of adjustment blocks mounted on said first housing part in overlying relation to said second housing part and on opposite sides of said pivot axis and a pair of adjusting screws, each screw being threadably mounted in a respective block perpendicularly of said second housing part for abutting said second housing part to pivot said second housing part about said pivot axis.

6. In a wafering machine, a combination comprising
   an internal diameter saw blade for slicing a crystal ingot disposed therein on a first axis;
   a spindle mounting said saw blade thereon for rotation about a spindle axis;
   a support shaft mounted on a fixed axis parallel to said first axis; and
   a housing having a first part pivotally mounted on said support shaft to pivot about said fixed axis, a second part rotatably mounting said spindle therein, means for pivotally mounting said second part on said first part on a pivot axis perpendicular to and passing through said fixed axis and said spindle axis and locking means for releasably securing said second part to said first part in an adjusted position about said pivot axis to maintain a cutting portion of said saw blade perpendicular to said fixed axis.

7. The combination as set forth in claim 6 which further comprises adjusting means for pivoting said second housing part on said pivot axis relative to said first housing part.

8. The combination as set forth in claim 7 wherein said adjusting means includes a pair of adjustment blocks mounted on said first housing part in overlying relation to said second housing part and on opposite sides of said pivot axis and a pair of adjusting screws, each screw being threadably mounted in a respective block perpendicularly of said second housing part for abutting said second housing part to pivot said second housing part about said pivot axis.

9. The combination as set forth in claim 6 wherein said means for pivotally mounting said second housing part is a bushing sleeve assembly disposed on said pivot axis.

10. The combination as set forth in claim 9 wherein said bushing assembly includes an expandable sleeve mounted in said first housing part on said pivot axis and rotatably receiving said second housing part thereon.

11. The combination as set forth in claim 6 wherein said locking means includes a plurality of screws passing through said second housing part into threaded engagement with said first housing part in parallel to said pivot axis.

12. The combination as set forth in claim 6 wherein said first axis, said fixed axis and said pivot axis are disposed on a common horizontal plane.

* * * * *

UNITED STATES PATENT AND TRADEMARK OFFICE
CERTIFICATE OF CORRECTION

PATENT NO.  : 4,974,578

DATED       : Dec. 4, 1990

INVENTOR(S) : WESLEY E. CHARLES, et al

It is certified that error appears in the above-identified patent and that said Letters Patent is hereby corrected as shown below:

```
Column 1, line 16 change "ha" to -have-
Colulm 4, line 31 change "axis about the pivot" to -about the
     pivot axis-
Column 4, line 55 change "relative be" to -relative minimum so
     that the overall operation of the machine need not be--
```

Signed and Sealed this

Fourteenth Day of July, 1992

Attest:

DOUGLAS B. COMER

*Attesting Officer*　　　　Acting Commissioner of Patents and Trademarks